Figure 1:
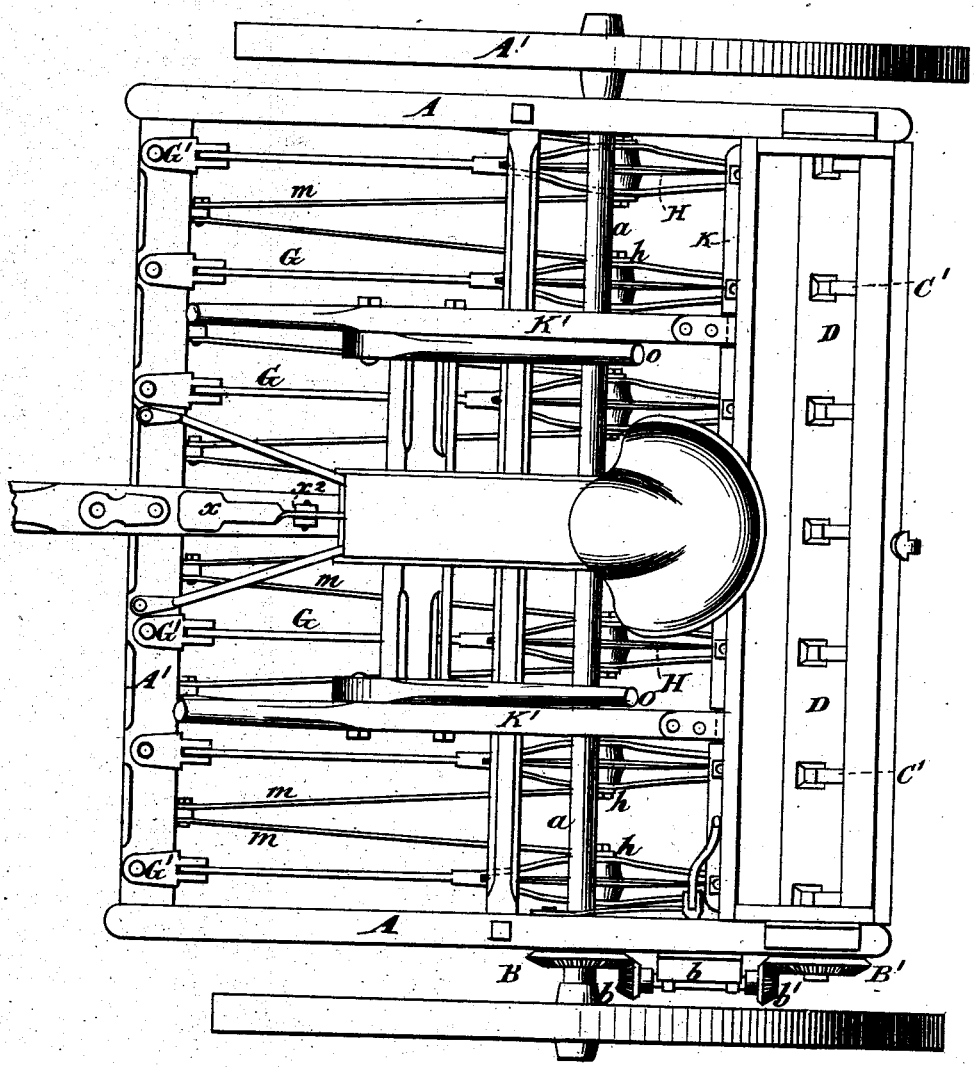

(No Model.)

3 Sheets—Sheet 1.

W. P. ELAM & W. F. BOGGS.
Grain Drill.

No. 237,001.

Patented Jan. 25, 1881.

Witnesses
A. Ruppert
Jas. F. Lange

Willoughby P. Elam,
Wilbur F. Boggs.
Inventors.
per Edson Brothers
Attorneys.

(No Model.) 3 Sheets—Sheet 2.

W. P. ELAM & W. F. BOGGS.
Grain Drill.

No. 237,001. Patented Jan. 25, 1881.

Witnesses:
A. Ruppert
Jas. H. Lange

W. P. Elam,
W. F. Boggs.
Inventors.
per Elden Brothers
Attorneys.

(No Model.)
W. P. ELAM & W. F. BOGGS.
Grain Drill.
No. 237,001.
3 Sheets—Sheet 3.
Patented Jan. 25, 1881.
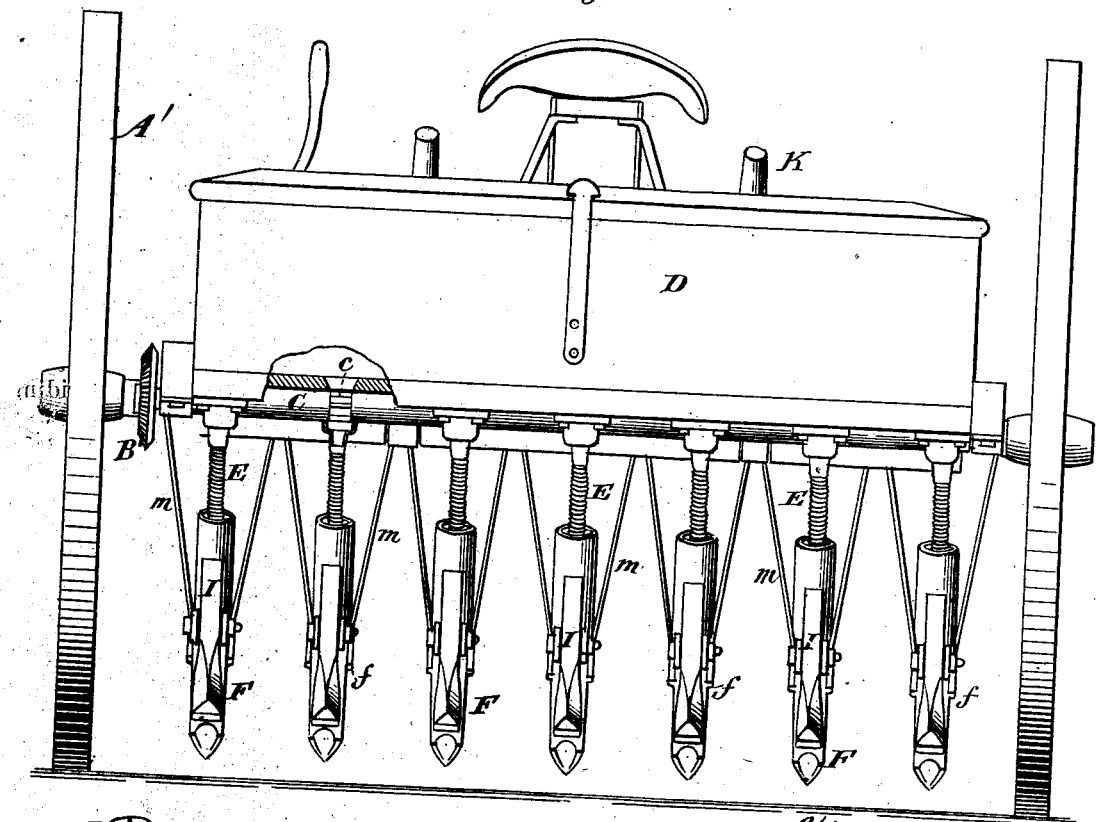
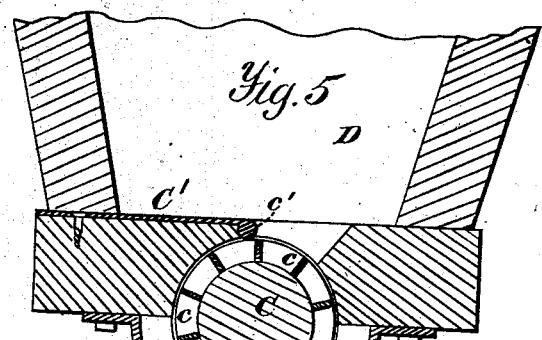
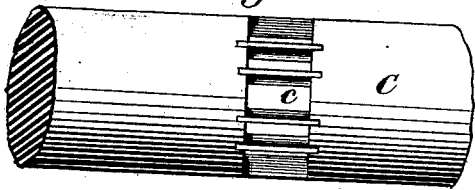
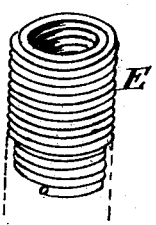
Witnesses.
A. Ruppert.
Jas. W. Lange.
W. P. Elam.
W. F. Boggs.
Inventors.
per Edson Brothers
Attorneys.

UNITED STATES PATENT OFFICE.

WILLOUGHBY P. ELAM AND WILBUR F. BOGGS, OF PETERSBURG, ILLINOIS.

GRAIN-DRILL.

SPECIFICATION forming part of Letters Patent No. 237,001, dated January 25, 1881.

Application filed April 27, 1880. (No model.)

*To all whom it may concern:*

Be it known that we, WILLOUGHBY P. ELAM and WILBUR F. BOGGS, of Petersburg, in the county of Menard and State of Illinois, have invented certain new and useful Improvements in Grain-Drills; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

Our invention relates to a sulky grain-drill; and the novelty consists in the construction and arrangement of parts, as will be more fully hereinafter set forth, and specifically pointed out in the claims.

The object of the invention is to provide a grain-drill which will cut the soil and grass ahead of the drill-flukes, will open the drill and plant the grain directly under the fluke, and will cover and press the soil upon the grain, as will be more particularly specified hereinafter.

The invention consists—

First, in a gang of jawed bifurcated drag-bars so formed as to incline all weeds, stalks, and the like below a revolving cutting-colter revolving within such drag-bars, which are pivoted or hinged in castings removably secured to the front cross-bar of the frame, and are capable of vertical motion when elevated by proper levers, or by the colter when passing over obstructions.

Second, in a gang of drag-bars properly held from lateral movement by stay-rods, each bifurcated to receive a revolving cutting-colter and for a presser-roll, and each embracing a seeding-fluke, properly recessed upon each side, and secured thereto, and each having a pivoted vertical rod, which passes loosely through a cross-bar upon the pivot or lever frame, and having a nut upon the upper end, and each drag-bar being held downward with the constant force of a spiral spring which surrounds the rod and bears against the cross-bar.

Third, in the rods which are hinged to the drag-bars and pass through the cross-bar of the lifting-frame. The upper ends of these rods are provided with screw-threads, and proper nuts prevent the withdrawal of the rods. The rods operate loosely in the cross-bar, and are surrounded by the spiral spring.

Fourth, the double spiral feed-tubes, of wire, in combination with grain-box and flukes.

Figure 2:
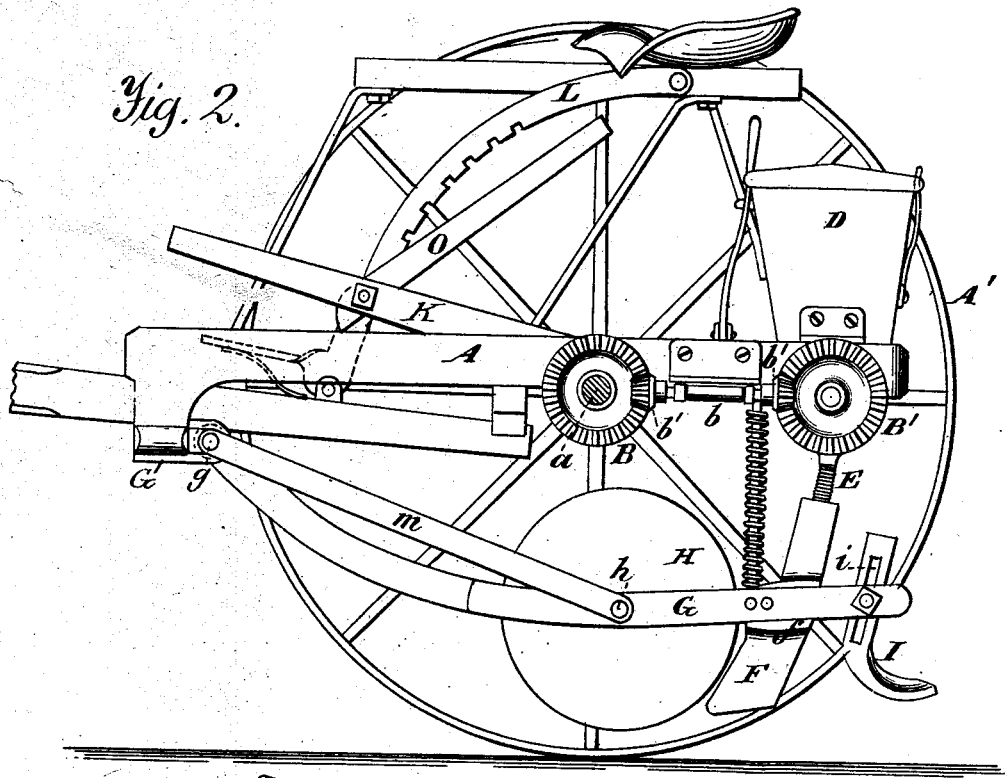
Figure 3:
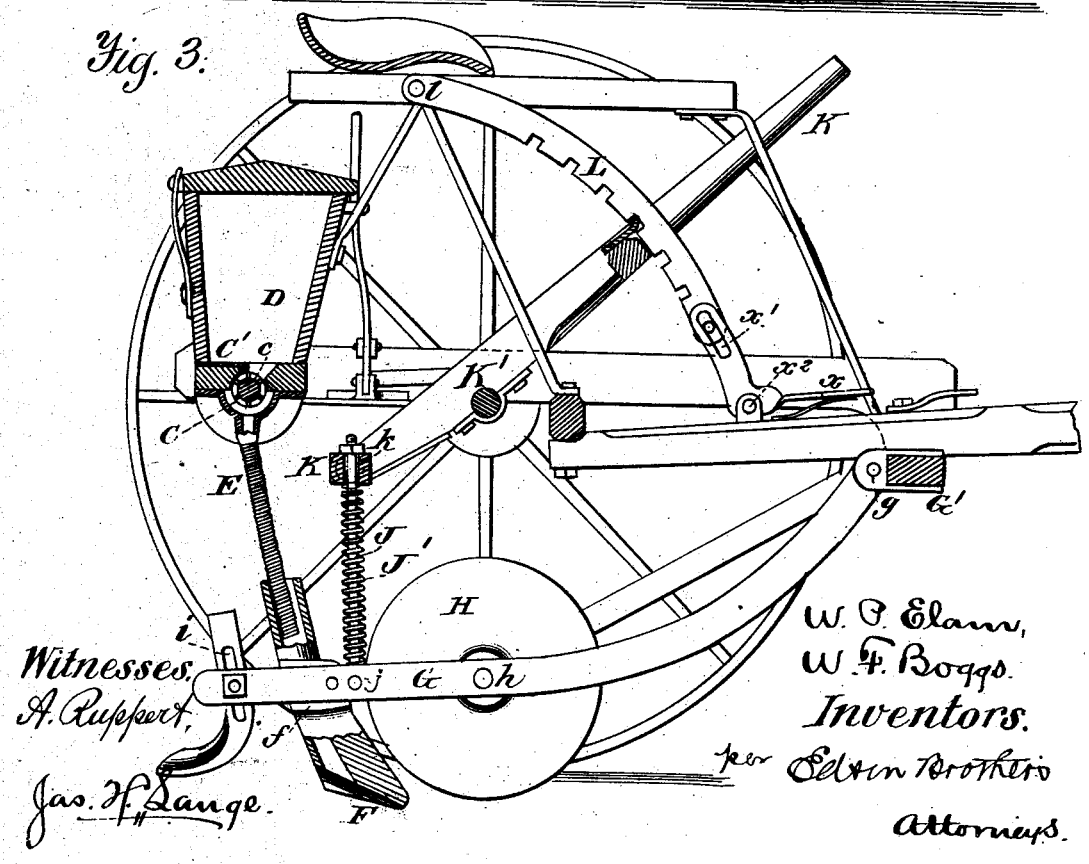

In the accompanying drawings, which form a part of this specification, Figure 1 is a plan view of our invention; Fig. 2, a side elevation, partly in section, showing one of the r g-wheels removed; Fig. 3, a side elevation, partly in section; Fig. 4, a rear elevation, partly in section; Fig. 5, an enlarged view of the grain-box and cell-shaft, and Figs. 6, 7, and 8, detail views.

Referring to the drawings, A represents the main frame, journaled in which is a shaft, $a$, carrying a rigid riding-wheel, A', and a loose wheel, as is usual in this class of machines. Rigid upon the axle $a$ is a bevel-gear, B, which meshes with a bevel-pinion, $b'$, upon a shaft, $b$, and a similar bevel-pinion, $b'$, upon the other extremity of the shaft $b$, meshes with a bevel-gear upon the cell-shaft C, having cells $c$, as shown.

C' represents a spring having a rounded end, $c'$, which spring sweeps the surface of the cell-shaft C, to insure even distribution of the grain in the cells. The cell-shaft is journaled in the bottom of the grain-box D, which is provided with a proper spring cover. Leading from the cavity in which the cell-shaft operates are a series of double spiral tubes, E, formed by coiling wire upon a mandrel in one direction and back in such a manner that the return-wire will fill the interstices of the former spiral. This construction makes a tighter tube than where a single wire is used, prevents the wind from blowing through and interfering with the grain, and makes a strong and efficient tube. These tubes E lead to an aperture in the flukes F, and through said flukes to the furrow. The flukes F are provided with recesses $f$, which receive the bifurcated extremities of the drag-bars G, to which they are properly secured by bolts or otherwise. The drag-bars are pivoted or hinged to castings G' at $g$ upon the front cross-bar of the frame A, and are bifurcated to receive a revolving colter, H, as shown. At the rear extremities of the drag-bars are journaled covering or presser rolls, if desired; but we prefer a removable interchangeable presser-foot, I, having a slot, $i$, by which it may be bolted to the drag-bar at any desired location at the will of the operator. Stay-rods $m$ serve to prevent lateral movement of the drag-bars, but allow a free vertical movement at will.

Pivoted at $j$ to the drag-bars G are rods J, which pass up through the cross-bar of the lifting-frame K at $k$, and the threaded ends of which are provided with nuts, as shown. The rods pass loosely through the frame K, to allow the elevation of the drag-bars when the colter passes over obstructions, and the nut allows the elevation of the whole series when it is desired to lift them in turning at the end of the field, or in transporting from one field to another. A spiral spring, J', surrounds the rod J, and bearing against the drag-bars below, and the under surface of the lifting-frame K above, serves to hold the flukes, &c., down to their work with a constant force, as is obvious.

K' represents a lever, the pivotal point of which is the axle $a$, by means of which the series of drag-bars, &c., are elevated out of the ground. It is provided with a plate, which operates in a curved rack-bar, L, pivoted at $l$, and operated by an elbow foot-lever, $x$, pivoted at $x^2$ and slotted at $x'$.

O represents auxiliary levers, by which the operator with his hands forces the flukes, &c., out of contact with the ground.

The operation of the machine is obvious: By the action of the lifting-levers the depth of the drilling is adjusted, and the position of the levers is secured by the plate on lever-frame engaging in the rack-bars, and by drawing the levers back the cross-bar of the lifting-frame is forced down upon the spiral springs, when necessary, in passing over hard ground, weeds, stalks, &c., thus adding additional pressure upon the drag-bars, cutter-wheels, &c. When the levers are thus thrown back the drag-bars still retain their independent vertical motion, meeting only with the increased resistance caused by the additional pressure upon the spiral springs.

We are aware that a single spiral spring has been before used as a feed-tube, and such construction is not sought to be covered in this application.

What we claim as new, and desire to secure by Letters Patent, is—

1. The drag-bars G, hinged to the castings $g$, and bifurcated, as shown, in combination with colter H, fluke F, covering device, and stay-rods $m$, and with means K K' J for elevating the gang, as specified.

2. The independent bifurcated drag-bars G, hinged at $g$, and carrying revolving colter H, flukes F, and presser-foot I $i$, combined with a rod, J, and with lifting-frame K, through which said rod operates loosely when said colter overrides obstructions, as herein specified.

3. The combination of the independent bifurcated drag-bars G, carrying revolving colter H, flukes F, and presser-foot I $i$, the rods J, lifting-frame K, through which said rods J work loosely, and spiral spring J', as and for the purposes specified.

4. The double-spiral feed-tubes E, in combination with grain-box D, flukes F, and the feed bar or roll, as specified.

In testimony that we claim the foregoing we have hereunto set our hands this 9th day of March, 1880.

WILLOUGHBY P. ELAM.
   WILBUR F. BOGGS.

Witnesses:
 THEO. C. BENNETT,
 O. B. CARTER.